United States Patent [19]

duBrucq

[11] 4,384,537
[45] May 24, 1983

[54] GERMINATED SEED PLANTER

[76] Inventor: William J. duBrucq, 25347 SW. 142nd Ave., Homestead, Fla. 33032

[21] Appl. No.: 274,874

[22] Filed: Jun. 18, 1981

Related U.S. Application Data

[63] Continuation-in-part of Ser. No. 252,466, Apr. 9, 1981.

[51] Int. Cl.$^3$ .......................... A01C 5/04; A01C 11/02
[52] U.S. Cl. .......................................... 111/2; 111/73; 111/89
[58] Field of Search .................. 431/158; 47/9; 111/2, 111/3, 6, 7, 34, 51, 50, 1, 73, 80, 89

[56] References Cited

U.S. PATENT DOCUMENTS

| | | | |
|---|---|---|---|
| 2,636,459 | 4/1953 | Graves | 111/51 |
| 2,993,626 | 7/1961 | Gildersleeve | 111/7 X |
| 3,306,239 | 2/1967 | Martin | 111/3 X |
| 4,117,787 | 10/1978 | Pavan | 111/2 |
| 4,265,185 | 5/1981 | Skipper | 111/34 X |
| 4,306,508 | 12/1981 | Skipper | 111/2 X |

Primary Examiner—James R. Feyrer
Attorney, Agent, or Firm—Harvey B. Jacobson

[57] ABSTRACT

A planter for discharging a quantity of germinated seed and a gel into a seed bed covered by a plastic film which has an opening formed therethrough and a cavity formed in the seed bed thereunder to receive the seed and gel. In addition, the planter discharges a measured quantity of growth media, such as soil with nutrients or the like incorporated therein, onto the gel and germinated seed through the same opening in the plastic film or mulch. The planter includes a squeeze tube pump for discharging a measured quantity of gel and germinated seed which operates in timed unison with a heated, bullet-shaped burner for forming an opening in the thermoplastic film and a cavity in the underlying seed bed with ground-engaging wheels operating the mechanism for forming the openings and discharging the germinated seed and gel at predetermined intervals and thus at predetermined spatial relationships. The media distribution system includes a hopper with a rotatable plate arrangement having cylindrical pockets formed therein for discharging a predetermined quantity of media, such as soil and nutrients, through the same opening immediately in trailing relation to the discharge nozzle for the gel and germinated seed with the ground-engaging wheels also operating the media distribution system.

6 Claims, 6 Drawing Figures

GERMINATED SEED PLANTER

CROSS-REFERENCE TO RELATED APPLICATION

The planter of the present invention includes the burner disclosed in my copending application Ser. No. 252,466, filed Apr. 9, 1981, for ALL WEATHER JET BURNER FOR PLANTERS and this application is a continuation-in-part thereof.

BACKGROUND OF THE INVENTION

1. Field of the Invention

The present invention generally relates to a germinated seed planter and includes a mechanism for forming a plurality of regularly spaced openings through a plastic mulch and forming cavities in an underlying seed bed at the same time, discharging a predetermined quantity of germinated seed and gel by using a squeeze tube pump and discharging a predetermined quantity of media onto the seed and gel through the same opening in the plastic film or mulch.

2. Description of the Prior Art

There has been developed a system of planting in which a matrix of gel and germinated seeds is deposited in a seed bed. Also, it is known to plant through a plastic film or mulch. The following U.S. patents disclose planter developments with which I am familiar:

U.S. Pat. No. 2,548,065—Apr. 10, 1951
U.S. Pat. No. 3,012,526—Dec. 12, 1961
U.S. Pat. No. 3,154,031—Oct. 27, 1964
U.S. Pat. No. 3,161,163—Dec. 15, 1964
U.S. Pat. No. 3,648,631—Mar. 14, 1972
U.S. Pat. No. 3,762,171—Oct. 2, 1972

While such known structures and systems exist, the prior patents to not disclose a combination of components and a mechanism for operating the same in a timed sequence in an effective manner for planting a gel and germinated seed mixture through a plastic film or mulch into a seed bed cavity and also discharging a predetermined quantity of growth sustaining media through the same opening in the plastic mulch.

SUMMARY OF THE INVENTION

An object of the present invention is to provide a planter for depositing a predetermined quantity of germinated seed, gel matrix and growth media through an opening formed in a plastic film or mulch and into a cavity in a seed bed with the opening and cavity being formed by a bullet-shaped burner which is heated by combustible gaseous material with all of the mechanism being operated mechanically from ground-engaging support wheels for a towed vehicular structure.

Another object of the invention is to provide a planter in accordance with the preceding object in which the gel and germinated seed mixture is flowable and is pumped by a positive displacement pump of the squeeze tube type which will discharge a predetermined quantity of gel and germinated seed for each cycle of operation of the pump.

A further object of the invention is to provide a planter in accordance with the preceding objects in which the growth sustaining media is discharged by a rotatable plate having a plurality of cylindrical trap chambers therein associated with an overlying plate having a single opening therein with the chambers being selectively alignable with the opening for receiving a predetermined quantity of media therein with the rotatable plate then conveying the media to a position in alignment with a gravity discharge tube or chute having a closure mechanism at the lower end which is opened mechanically by a driving connection with the support wheels which also drives the rotatable plate and squeeze tube pump at different ratios.

Still another object of the invention is to provide a planter in accordance with the preceding objects in which an operating linkage interconnects the burner for forming the openings and cavities in the seed bed with the mechanism for operating the gel and germinated seed pump and the media distribution system, thereby providing a mechanically driven arrangement which is relatively simple in construction, easy to adjust for proper timing and dependable and long lasting in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the present invention illustrating the association of the planter with a towing vehicle, such as a tractor, or the like.

DESCRIPTION OF THE PREFERRED EMBODIMENT

Figure 1:
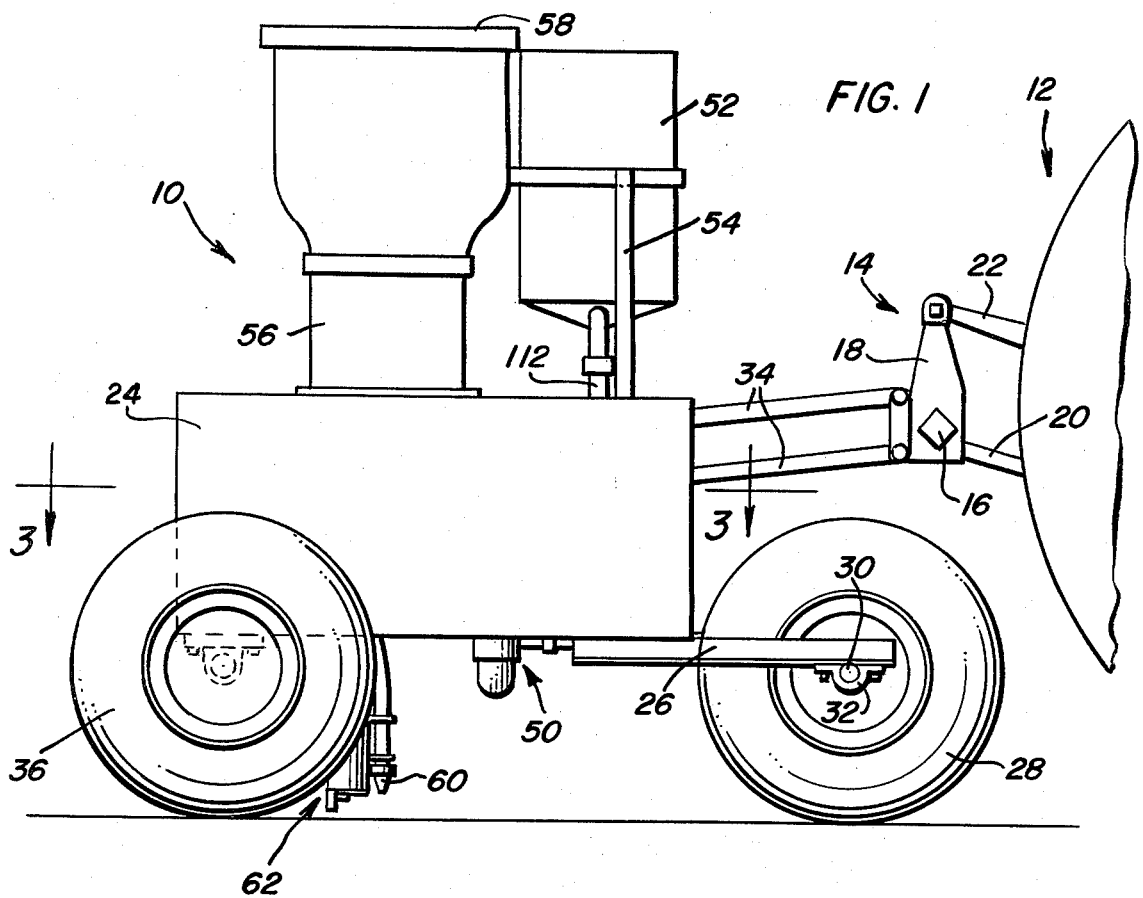
Figure 2:
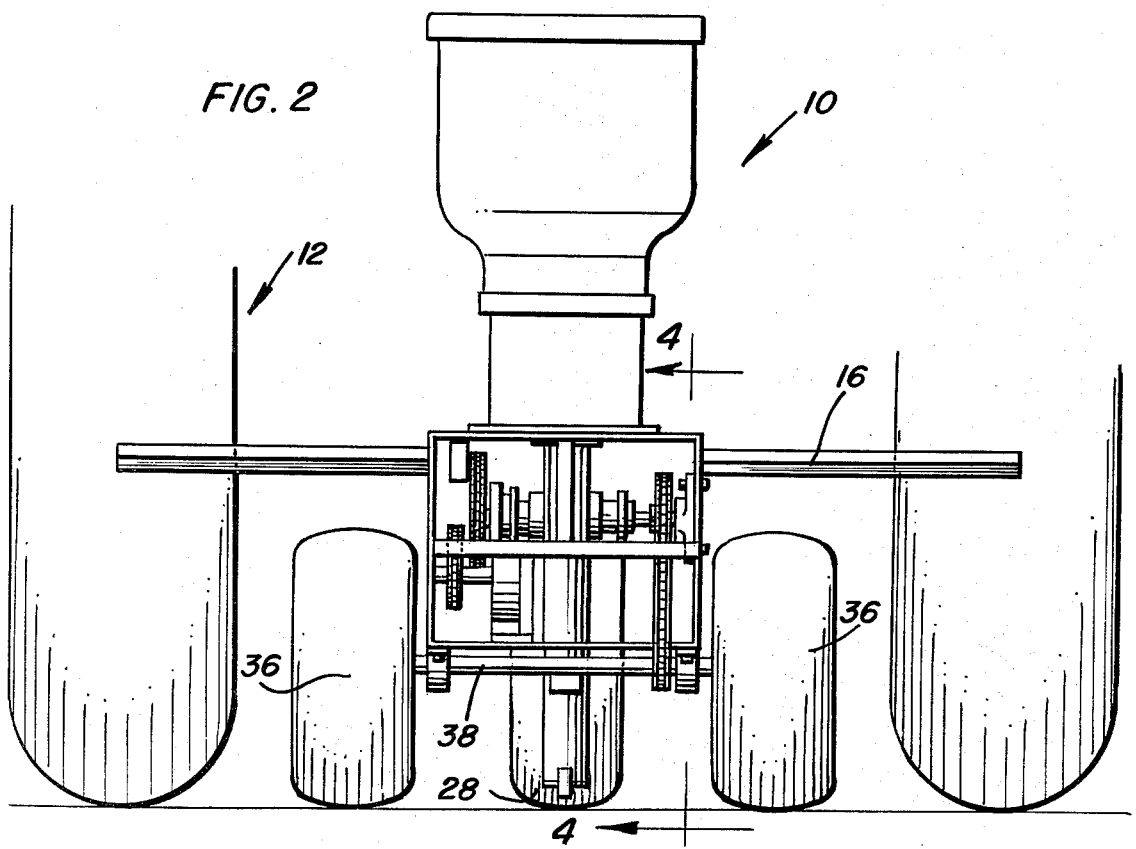
FIG. 2 is a rear elevational view of the construction of FIG. 1.
Figure 3:
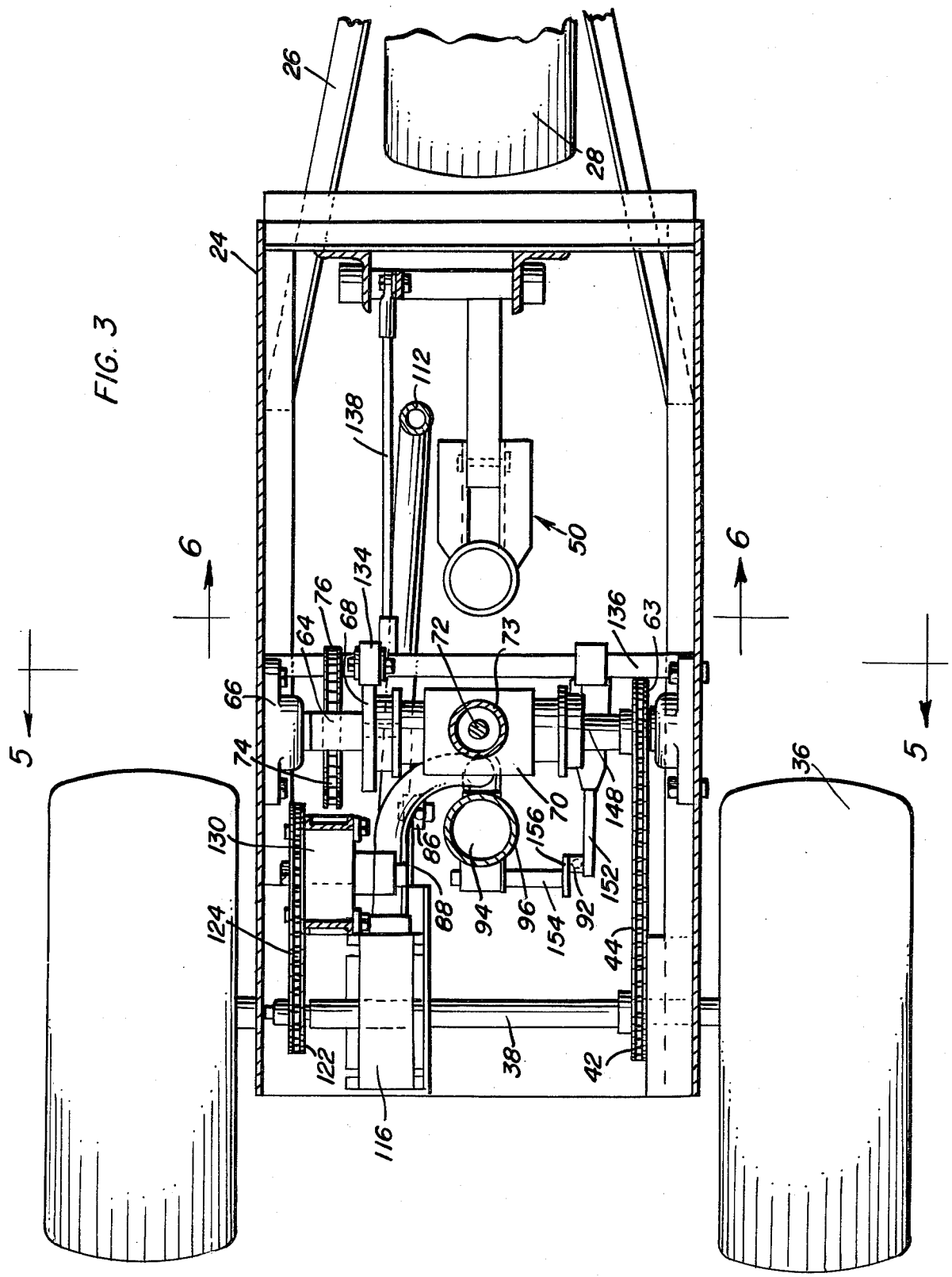
FIG. 3 is a longitudinal, plan sectional view, taken substantially upon a plane passing along section line 3—3 of FIG. 1, illustrating the arrangement of the components of the planter.

The planter of the present invention is illustrated in its entirety in FIG. 1 and is designated by numeral 10. The planter 10 typically may be connected to a towing vehicle such as a tractor 12 having a three-point hitch assembly 14 at the rear thereof including a tool bar 16, and A-frame 18, lower arms 20 and an upper control arm or link 22 all of which represents conventional tractor structure for connecting a towing implement thereto. The planter 10 includes a housing 24 supported at its front by a pair of forwardly extending frame members 26 journaling a front wheel 28 therebetween with the wheel 28 being supported on an axle 30 supported by pillow block bearings 32. The housing 24 also includes a pair of forwardly extending upper frame members 34 connected with the tool bar in a conventional manner. The rear of the housing 24 is supported by a pair of spaced rear support wheels 36 which also are in the form of drive wheels to drive the planter mechanism to be described hereinafter. The rear support wheels 36 are carried by an axle 38 journaled in pillow block bearings 40 in a conventional manner with suitable lubrication facilities being provided therefor. Also, the axle 38 is provided with a drive sprocket gear 42 adjacent one end thereof and interiorly of the housing 24 with the sprocket gear 42 being engaged by a sprocket chain 44 which extends forwardly and upwardly in relation to the axle 38. The wheels 28 and 36 may be conventional pneumatic tires or the like with the rear wheels 36 including traction producing tread to assure that the planter mechanism will be operated as the planter is towed along a seed bed surface as at 46 which may be a flat seed bed, a raised or elevated seed bed, or the like, provided with a thermoplastic film or mulch 48 thereon.

The planter 10 includes a burner generally designated by numeral 50 at the forward end portion of the planter and a hopper 52 on top of the housing 24 at the forward end of the housing for a mixture of germinated seed and gel matrix which is a flowable mixture with the hopper 52 being supported from the housing by any suitable upstanding bracket structure 54. A second hopper 56 is supported from the housing 24 rearwardly of the hopper 52 and provides a supply of growth sustaining media including soil and nutrients with the hopper 56 including a top plate 58 and a suitable supporting bracket structure or the like. Also, the planter is provided with a discharge nozzle 60 for the germinated seed and gel matrix mixture and a discharge structure generally designated by the numeral 62 for the media from the hopper 56 with the actuating mechanism for the burner 50, the mechanism for discharging the germinated seed and gel matrix and the mechanism for discharging the media all being operated from the rear driving wheels 36 through the sprocket gear 42 and sprocket chain 44 in a manner described hereinafter.

The sprocket chain 44 is entrained around and drivingly engages a sprocket gear 63 on a transversely extending cam shaft 64 that is journaled in flanged block bearings 66 engaged with opposite walls of the housing 24 and mounted thereon in a conventional manner for rotatably supporting the cam shaft 64. The cam shaft 64 includes a cam 68 thereon adjacent one end and incorporated into the center thereof is a gear box 70 which has an upwardly extending shaft 72 disposed centrally in a housing 73. Also mounted on the cam shaft 64 is a sprocket gear 74 adjacent the opposite end from the sprocket gear 63 with a sprocket chain 76 entrained thereon and engaged with a small sprocket gear 80 on a stub shaft 82 journaled from the rear portion of the housing with the shaft 82 including a crank arm 84 thereon having a rod 86 connected thereto and extending downwardly therefrom and connected to one end of an arm 88 connected with a ratchet gear assembly 130 as set forth hereinafter. Forwardly of the shaft 82 a discharge tube 96 is provided which extends upwardly through the top of the housing and is fixedly secured thereto in communication with the interior of the bottom portion of the hopper 56. The lower end of tube 96 has a closure flap 94 thereon operated by rod 92 in a manner set forth hereinafter.

The interior of the hopper 56 is provided with a stationary plate 98 having a single hole 100 therein which forms a bottom for the material placed in the hopper 56. The stationary plate 98 overlies a rotatable plate 102 which has three cylinders thereon as designated by the numeral 104 with the upper end of the cylinders being communicated with and flush with the rotatable plate 102 and the lower end thereof being closed by the bottom plate 106 of the hopper 56 which has the upper end of the tube 96 communicated therethrough so that in one position of each of the cylinders 104 it will be in communication with the tube 96 for discharging material into the tube 96. During rotation of the rotatable plate 102 which is drivingly connected to the upper end of the shaft 72, the cylinders 104 will be sequentially aligned with the opening 100 in the stationary plate 98, thereby enabling a predetermined quantity of media within the hopper 56 to fill the cylinder that is aligned with the opening 100 and during subsequent rotation, this material will be discharged into the tube 96 as the full cylinder 104 becomes aligned with the upper end of the tube 96, at which time the material drops by gravity down through the tube and is discharged therefrom when the flap 94 is moved to open position. The upper surface of the shaft 72 has a rotatable agitator 108 having three blades 110 thereon with the blades being rotatably connected to the shaft 72 for rotation therewith immediately above the plate 98 thereby maintaining the media within the hopper 56 in a flowable condition and maintaining the upper surface of the stationary plate 98 substantially free of material becoming clogged thereon.

Figure 4:
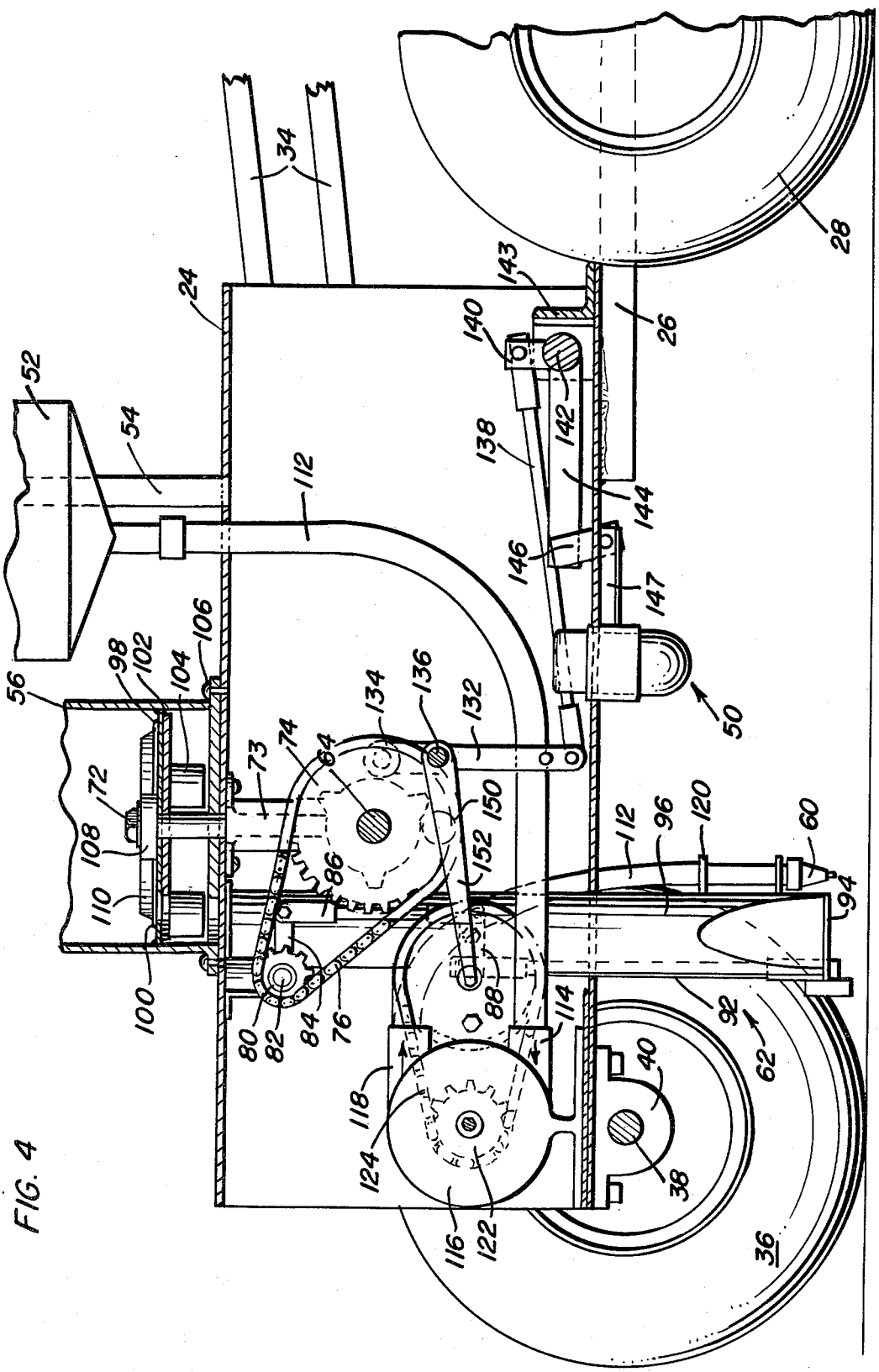
FIG. 4 is a longitudinal, vertical sectional view, taken substantially upon a plane passing along section line 4—4 of FIG. 2, illustrating further structural details of the planter.
Figure 5:
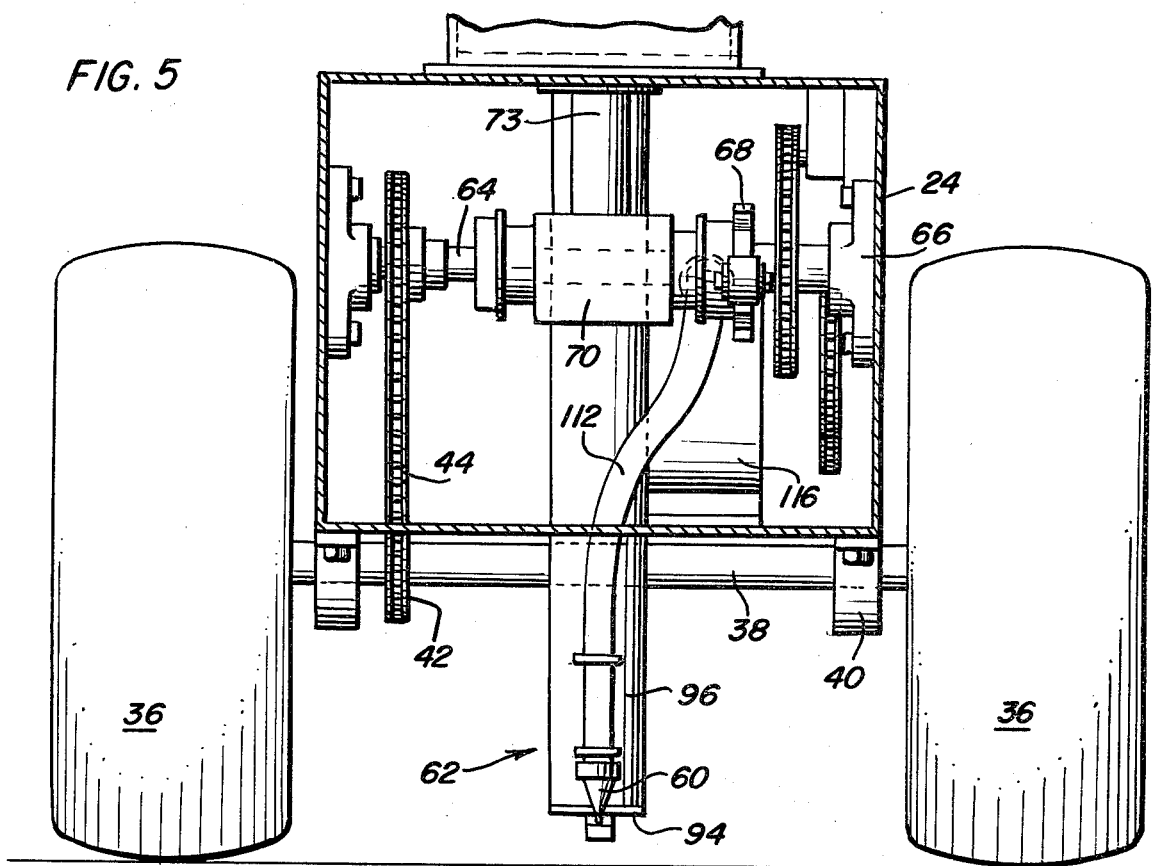
FIG. 5 is a transverse, sectional view, taken substantially upon a plane passing along section line 5—5 of FIG. 3, illustrating further structural details of the planter.
Figure 6:
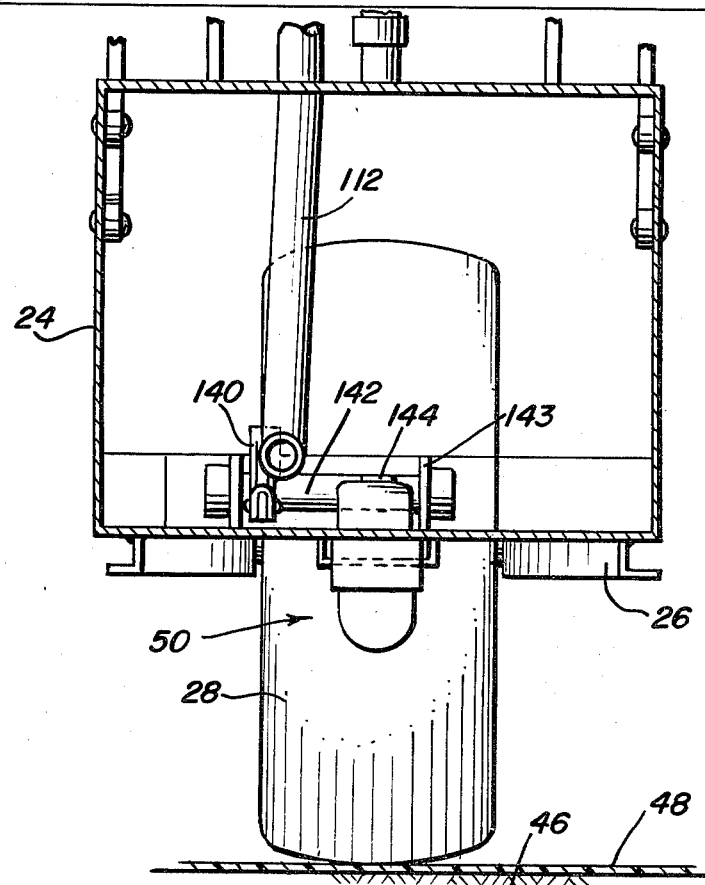
FIG. 6 is a transverse, sectional view, taken substantially upon a plane passing along section line 6—6 of FIG. 3, illustrating further structural details of the planter, including the bullet-shaped burner for forming the openings and cavities.

For discharging the germinated seed and gel from the hopper 52, the lower end of the hopper 52 is provided with a tube 112 connected thereto with the tube being flexible and constructed of resilient material, such as plastic or the like, and extending into the lower inlet 114 of a squeeze tube pump 116 which has a discharge 118 at the upper end thereof. The tube then extends downwardly alongside of the media tube 96, as illustrated in FIG. 4, and is retained in place by brackets 120 with the tube terminating in the nozzle 60 which is immediately in front of the closure flap 94 so that the germinated seeds and gel which are pumped through the tube 112 by the squeeze tube pump 116 is discharged from the nozzle 60 and the media is discharged from the tube 96 through the same opening in the plastic film or mulch and into the same cavity in the seed bed during operation of the planter.

The pump 116 is driven from a sprocket gear 122 on the pump shaft with the gear 122 being engaged by a sprocket chain 124 that, in turn, is entrained on the ratchet gear assembly 130 which is caused to rotate in increments by the crank arm 88 and rod 86 at a reduced ratio. The pump 116 includes the continuous flexible tube 112 therethrough and is a Randolph-Austin No. 610 squeeze tube pump which provides a positive displacement by squeezing the tube from the inlet to the outlet. With this structure, a predetermined quantity of germinated seed and gel is discharged from the nozzle for each cycle of operation and the rotatable plate 102 with cylinders 104 therein discharges a fixed amount of media into the down tube 96 with the exact point of media placement being controlled by the cam operated door or flap 94 at the lower end of the down tube 96. The rotatable plate 102 provides accurate measurement of the media and prevents more than one cylinder 104 having its contents discharged into the down tube at any given time, thus preventing packing. The three-bladed scrubber 108 above the stationary plate 98 prevents media packing on the upper surface of the plate.

For operating the burner 50, a lever 132 has a cam follower 134 engaging the cam 68 on the cam shaft 64. The lever is supported on a transverse shaft 136 and the lower end is connected to a rod 138 having its opposite end connected with a short crank arm 140 attached to a shaft 142 supported on housing 24 by brackets 143 and which has a long crank arm 144 provided with lugs 146 connected to the burner bracket 147. The structure of the burner 50 and the manner in which it is supplied with gaseous combustible fuel is disclosed in co-pending application Ser. No. 252,466, filed Apr. 9, 1981, which disclosure is incorporated herein by reference thereto. Thus, as the cam shaft 64 rotates, the cam 68 engaging the cam follower 134 will cause the lever 132 to oscillate about the shaft 136, thus causing the crank arms 140 and 144 to pivot about shaft 142, thus raising and lowering the bullet-shaped burner 50 in relation to the plastic mulch and seed bed. To operate the closure door or flap 94, the cam shaft 64 is provided with a second cam 148 engaged with a follower 150 on an intermediate portion of a lever 152 that is supported at one end from the shaft 136 and engaged with an actuating rod 92 at the other end to oscillate the rod 92, thus opening and closing the closure door or flap 94 at the lower end of the down tube 96 in which the closure door or flap 94 is pivotally supported on a shaft 154 having an arm 156 connected with the rod 92 which extends downwardly from its connection with the oscillating end of the lever 152. Thus, as the cam shaft 64 rotates, the cam 148 engaging the follower 150 will oscillate the lever 152 thus opening and closing the closure door or flap 94 in timed relationship to the raising and lowering of the burner assembly and in timed relationship to the discharge of a predetermined quantity of germinated seed and gel from the nozzle 60.

In operation, the planter 10 is pulled along a seed bed by the tractor or other suitable towing vehicle with the planter being used singly to plant a single row of seeds or multiple planter units may be employed as desired. Rotation of the rear wheels drives the planter unit through the chain drive to the cam shaft with the cam shaft including a right angle gear drive in the gear box to rotate the plate in the media hopper and to rotate the three-bladed scraper or agitator. The cam 68 on one end portion of the cam shaft raises and lowers the burner 50 while the cam 148 on the other end of the cam shaft opens and closes the closure flap or door 94 at the lower end of the down tube. The cam shaft is also provided with a drive sprocket which drives a small sprocket wheel and shaft which actuates a connecting rod connected with a ratchet sprocket gear assembly that has a sprocket chain drive to the squeeze tube pump so that for each cycle of operation, the pump will be rotated 180° to provide for discharge of a predetermined quantity of gel and germinated seed which flows through the flexible tube which interconnects the hopper and nozzle by squeezing the tube where it goes through the pump in a well known manner, so that the burner will form a hole in the plastic film or mulch and also form a cavity in the seed bed, the nozzle will discharge a predetermined quantity of gel and germinated seed into the cavity through the opening and the down tube will discharge a predetermined quantity of soil or other growth media into the cavity on top of the gel and germinated seeds through the same opening in the plastic film.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A planter comprising a supporting structure having at least one rotatable ground-engaging wheel adapted to rotate in response to movement of the supporting structure over a seed bed with a plastic mulch film thereon, a bullet-shaped burner mounted on said supporting structure and driven by said wheel to form a hole through the plastic mulch film and form a cavity in the underlying seed bed, a hopper mounted on said supporting structure providing a supply of germinated seed and gel, means to discharge a quantity of seed and gel through each hole formed in the mulch film and into the cavity in the seed bed, a hopper on said supporting structure for a growth enhancing media and means driven by said wheel to discharge a quantity of said media through each of the holes formed in the mulch film into the cavity in the seed bed immediately after the germinated seed and gel has been deposited therein.

2. The structure as defined in claim 1 wherein said means to discharge a quantity of germinated seed and gel includes a flexible tube extending from the hopper and terminating in a downwardly directed discharge nozzle, a squeeze tube pump receiving said tube and discharging a predetermined quantity of material in the tube for each cycle of operation of the pump and means driving the pump in timed relation to the burner for discharging the measured quantity of germinated seed and gel through each of the holes in the mulch film and into each of the cavities formed in the seed bed.

3. The structure as defined in claim 2 wherein said last-named means including a rotatable plate in the hopper having a trap chamber for selective alignment between misaligned top and bottom apertures for discharging a predetermined quantity of media for each cycle of movement of the rotatable plate, a drop tube for the media from the hopper to a point adjacent the plastic film mulch, and means driven by said wheel to open and close the drop tube.

4. The structure as defined in claim 3 wherein said means to open and close the drop tube includes a closure flap at the lower end thereof, a rod attached to the flap and extending alongside the drop tube, means driven from the wheel to reciprocate the rod to move the flap between closed and open positions.

5. The structure as defined in claim 4 wherein said burner, discharge nozzle and lower end of the drop tube are in longitudinal alignment with the nozzle and the flap being closely adjacent each other.

6. The structure as defined in claim 5 wherein said rotatable plate includes a vertically disposed rotatable shaft connected thereto, a gear box connected with said vertical shaft, said gear box including an input connected to the drive wheel through a sprocket and chain drive.

* * * * *